Dec. 26, 1967 E. WOLF ET AL 3,360,635

HEAD FOR READING A PERFORATED RECORD MEDIUM

Filed Feb. 23, 1967

INVENTORS
Edgar Wolf
David E. Worster

BY Yuter & Spencer
ATTORNEYS

3,360,635
HEAD FOR READING A PERFORATED RECORD MEDIUM

Edgar Wolf, New Hyde Park, and David E. Worster, West Islip, N.Y., assignors to Digitronics Corporation, Albertson, N.Y., a corporation of Delaware
Filed Feb. 23, 1967, Ser. No. 618,218
10 Claims. (Cl. 235—61.11)

ABSTRACT OF THE DISCLOSURE

A reading head for reading a multichannel perforated record medium comprises a record medium support block. Through the block are drilled a plurality of straight light passageways. Each passageway has a first end for registration with one of the channels of the record medium and a second end opposite which there is positioned a photovoltaic element. Above the block and positioned at a point in a plane through the perpendicular bisector of the line passing through the first ends of the passageways is a short filament source of light. Each of the straight light passageways is colinear with an optical radius vector extending from the source of light to the first end of the light passageway.

Figure 2:
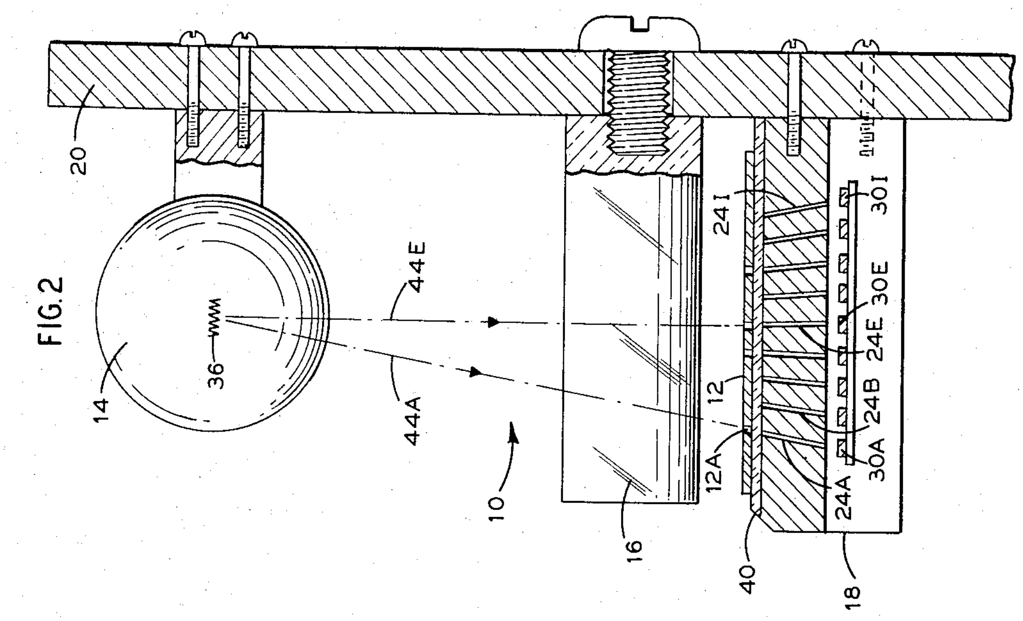

This invention pertains to electro-optical reading heads and more particularly to such reading heads for sensing information recorded on perforated record media.

Perforated record media such as multichannel punched paper tapes have been in existence for a very long time. The first reading heads for sensing the perforations relied on the closing of electrical circuits via feelers which passed through the perforations. When faster reading speeds are required photoelectric techniques are employed. Generally, a light source is disposed on one side of the paper tape and photoelectric devices are placed opposite the channels on the other side of the paper tape. The passage of light through a perforation results in the generation of an electrical signal by the photoelectric device. The first photoelectric devices were photoelectric vacuum tubes. However, since the advent of solid state electronics photo-transistors are employed.

While photo-transistors lead to a simplification and miniaturization of the reading heads, they did not solve some of the problems and, in fact, created new problems in the optical sensing of punched paper tape. Photo-transistors are expensive both from the viewpoint of unit cost as well as from the viewpoint of assembling and testing. Photo-transistor reading heads have tight specifications and require tight quality control. In addition, the photo-transistor circuits reqire adjustable potentiometers because there is a typical unit-to-unit variation in response of 4:1 and the paper tape is relatively translucent.

Any good multichannel paper tape reading head must satisfy certain criteria. It must have a high "signal-to-noise ratio" (here defined as the ability to differentiate between a hole and no hole in the poorest grades of the paper). This is important because of the large variety of available paper tapes. The tapes range from totally opaque to quite translucent, and through a wide color spectrum. The tape, in addition, may have oil stains and non-uniformities. It must have good perforation or hole shape reproduction, for standard paper tape data holes are .071" in diameter and sprocket holes are .046" in diameter. The sprockets are used to provide sampling information for the data. It is desirable to produce as faithfully as possible a signal such as would be obtained if the tape were scanned along the centerline of all channels by a point scanner. There would thus be obtained sharp digital transitions with minimum dependence on tape punching and guiding position accuracy. In other words, small holes can stand worse tape-to-head mis-alignment. The limit of small scanning spot size is that of confusing a hole for a flaw in the paper. Thus, hole shape reproduction becomes a compromise between the small spot desirability associated with the tolerance of misadjustment and the large spot size desirability of averaging paper properties.

The reading head should be self-cleaning on the exposed active surface and dust enclosed where there is no cleaning.

There must be high channel-to-channel uniformity, i.e. minimum variation of the individual photosensors and minimum unpredictable channel-to-channel variation of the illumination.

The head must have long life. The sensors and especially the light sources must have long service life and be fairly rugged to survive shipment.

The head must be stable. Parameters' variations with time and environment must be minimal.

The head must be easily adjustable. A simple adjustment procedure is important both for initial (factory) setup and for field adjustment after illumination source replacement. Low skilled personnel should be capable of performing the adjustment with a minimum of test equipment.

It is a general object of the invention to provide a perforated record medium reading head which satisfies each of these criteria.

It is another object of the invention to provide such a reading head which while satisfying these criteria is still relatively inexpensive.

Generally, the invention contemplates a reading head for reading a multichannel record medium comprising a support block for supporting the record medium during its movement over the block. In the block, there are a plurality of straight light passageways. The passageways extend through the block and have one end at the surface of the block adjacent to the record medium for registration with one of its channels and another end at the surface of the block remote therefrom. A radiation element which has a dimension very much smaller than the transverse distance between the outermost channels of the record medium (ideally, a point source) is disposed in a region opposite to but displaced from the record medium bearing surface. At the other end of each of the passageways is disposed a means for converting light energy to electric signals. In order to ensure the reliable capture of light energy the straight light passageways are colinear with optical radius vectors extending from the light radiation element to the ends of the light passageways. By an optical radius vector is meant the path a ray of light would take through a light transparent medium. If the medium is air it would be a straight line. If the medium includes optical surfaces then the path would deviate from a straight line in accordance with the types of surfaces encountered.

Figure 1:
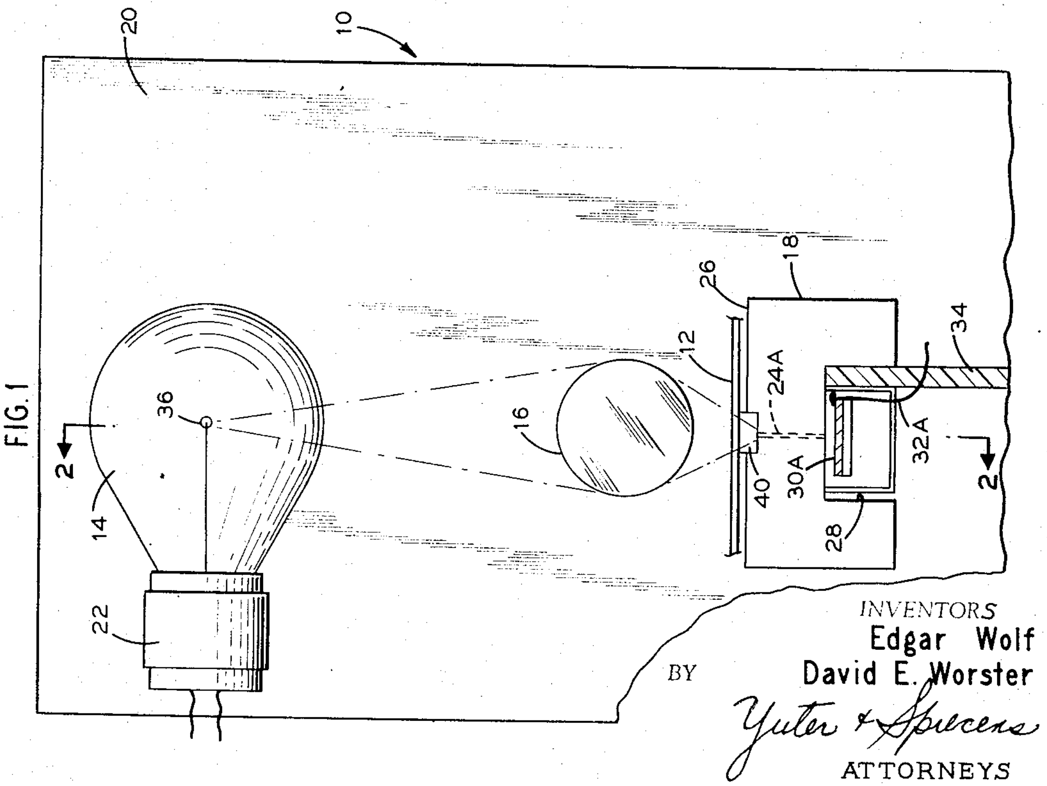

Other objects, the features and advantages of the invention will be apparent from the following detailed description when read in connection with the accompanying drawings which show, by way of example and not limitation, the new preferred embodiment of the invention. In the drawings:

FIGURE 1 shows a side view of a perforated record medium reading head in accordance with the invention; and FIGURE 2 is a sectional view taken along the line 2—2 of FIGURE 1.

Referring now to FIGURES 1 and 2, there is shown a reading head 10 for reading a conventional multichannel punched paper tape 12. Since the tape transport mechanism is conventional and not the subject matter of the present invention it will not be shown or described except to the extent that such mechanism moves the paper tape 12 from left to right as viewed in FIGURE 1. The reading head 10 comprises primarily a lamp (source of light) 14, a lens 16 and a tape support block 18 all carried by support body 20. Lens 16 and block 18 are fixed to body 20 in any conventional manner. Lamp 14 is supported through the agency of a sleeve member 22 to permit horizontal adjustment of its position with respect to block 18 as will hereinafter become apparent.

Block 18 is preferably made of a rigid material through which pass a plurality of light passageways 24A to 24I spaced transverse to the movement direction of tape 12. Each of the passageways has an end which opens up on the top surface (the surface over which the tape rides) 26 of block 18; and another end which opens up on an opposite surface of the block. Preferably, a slot 28 is cut through this opposite surface to house the photo-sensors 30A to 30I. The photo-sensors 30A to 30I are a plurality of photo-voltaic cells in a monolithic configuration with signal leads such as 32A connected to a terminal board 34. Each of the photo-sensors 30 is opposite one end of one of the passageways 24 whose other end is in registration with one of the channels of the paper tape 12. In the example shown, a nine channel tape is employed, eight channels for data and one channel for the sprocket. Thus, sensors 30A to 30C and 30E to 30I sense data perforations and sensor 30D senses sprocket perforations.

Light source 14 is an incandescent bulb with a filament or radiation element 36. In the ideal, element 36 should be a point source however as a practical matter the filament has an appreciable length dimension. However, this dimension is only a small fraction of the distance between the two opposite outermost channels of tape 12. The length dimension is aligned transveres to the movement of the tape 12 and parallel to the centerline of the top ends of the passageways 24. In addition, the length dimension should lie in a plane (the centerline plane) that includes that centerline and is perpendicular to the plane of the portion of the tape 12 lying over that centerline. For this reason collar 22 is provided so that the length dimension of the filament 36 can be properly aligned in the centerline plane.

The lens 16 is a cylindrical lens interposed between source 14 and block 18 to collect light from filament 36 and focus it at substantially the top ends of the passageways 24. Thus, light from source 14 passes through lens 16 to the paper tape 12. If a perforation such as 12A is present, the light enters the associated passageway. If no perforation is present such as in the region of the paper tape 12 opposite passageway 24B no light enters that passageway. If light enters a passageway its associated photo-sensor 30 emits an electrical signal.

Now in order to enhance the reliability of the readings several measures are taken. First, in order to make the readings less sensitive to dust or dirt a glass plate 40 is placed over the top ends of the passageways. Thus the passageways are sealed off from dust or dirt and the tape constantly wipes the plate as the tape moves.

Second, and more importantly, the "signal-to-noise" ratio is maximized by the following techniques which take advantage of the scattering of the incident light in the paper. Collimated light passes through the tape perforations without effect but those parts of the light not absorbed when the light strikes the paper are scattered over a large solid angle. Therefore, if the sensing of light can be made highly directional, only that portion of the light which retains approximately the incident direction is sensed. Directional sensing is readily accomplished by placing the photo-sensors at the ends of long thin tunnels with light absorbing sides. Consequently, passageways 24 have lengths of at least four and preferably eight times greater than their diameters. In addition, the inner walls of the passageways are blackened.

Next, to reproduce "hole" sizes as faithfully as possible with mis-alignment due to mis-punching and mis-guiding the passageway diameter is slightly less than the diameter of the smallest standard perforation.

Now because of the highly directive light sensing and small passageway diameters together with the need to illuminate across a tape of considerable width the light source becomes a problem. If the axis of the passageways are perpendicular to the surface of the tape and the block, then a high intensity and very long filament lamp is required. Long filament lamps either lack adequate light output, uniform light output, or long life, or any combination thereof.

Now, this problem is solved according to the invention by aiming all the passageways at a common point, placing the "short" filament of a high intensity bulb substantially at that point and interposing between the filament and the top ends of the passageways a cylindrical lens. The point is typically chosen to be vertically above the center passageway 24E. Stated in a different way each of the straight passageways is colinear with an optical radius vector extending from the bulb filament to the top end of the passageway. Typical vectors 44A and 44E for passageways 24A and 24E are shown in FIGURE 2. It should be noted that for small angles from the normal involved, the translation of light rays in the profile view is rather small and can be neglected.

The following are typical parameters associated with a working embodiment of the invention used with 9-hole paper tape which is one inch wide and has data holes with .071" diameter and sprocket holes with .046" diameter:

| | |
|---|---|
| Light source **14** | General Electric 1073 with a C–2R filament. |
| Lens **16** | 0.5 inch diameter Lucite cylinder at least 1.0 inch long. |
| Photo-sensor **30** | National Semiconductors Ltd. NSL–701–9P. |
| Filament-to-lens axis spacing | 1.6 inches. |
| Filament-to-top surface of block **18** spacing | 2 inches. |
| Diameter of light passageway | 0.035 inch. |
| Length of light passageways | 0.250 inch minimum. |

By using elongated light passageways and by aiming the passageways at a common remote point source of light extremely good "signal-to-noise" ratio is obtainable. In fact with yellow oiled Teletype tape a 40:1 signal-to-noise ratio was obtained; with pin oiled Teletype tape a 30:1 ratio; and with pink Teletype tape drenched in oil a 6:1 signal-to-noise ratio was obtained.

By using a monolithic photo-voltaic sensor array with "aimed" passageways and a cylinder lens, an inexpensive short-filament-high-intensity long-life bulb can be employed. In fact, the bulb employed in the working embodiment is a conventional automobile "tail light" bulb.

While only one embodiment of the invention has been shown and described in detail, there will be now obvious to those skilled in the art many modifications.

What is claimed is:

1. A reading head for reading a multichannel perforated record medium comprising a record medium support block, said support block having at least one substantially flat surface upon which said record medium is carried for supporting a record medium during the record medium's longitudinal movement over said support block, a plurality of straight light passageways extending through said support block, each of said light passageways having a first end at the surface of the support block adjacent the record medium for registration with one of the channels thereof and a second end at the surface of said support block remote therefrom, a light radiation element with a dimension very much smaller than the transverse distance between the outermost channels of the record medium, said light radiation element being displaced from and opposite said substantially flat surface of said support block for simultaneously illuminating said first ends of said light passageway adjacent the record medium, each of said light passageways being colinear with an optical radius vector extending from said light radiation element to its end in registration with a channel of the record medium; and a plurality of means for converting light energy to electric signals, each of said converting means being disposed opposite said second ends of said light passageways remote from said record medium, respectively.

2. The reading head of claim 1 wherein the diameter of said light passageways is at least four times smaller than the length of said light passageways.

3. The reading head of claim 1 wherein the inner walls of said light passageways are of a non-reflecting material.

4. The reading head of claim 1 further comprising a lens disposed between said radiation element and said support block for focusing light in the vicinity of the line through said one end of said light passageways.

5. The reading head of claim 1 further comprising a transparent member on the surface of said support block for covering said one end of said light passageways whereby said record medium moves over said transparent member.

6. The reading head of claim 1 wherein the cross-sectional dimensions of said light passageways are less than the cross-sectional dimensions of the perforations in the record medium.

7. The reading head of claim 1 wherein the diameter of said light passageways is at least four times smaller than the length of said light passageways and the inner walls of said light passageways are of a non-reflecting material.

8. The reading head of claim 7 wherein the cross-sectional dimensions of said light passageways are less than the cross-sectional dimensions of the perforations in the record medium.

9. The reading head of claim 1 further comprising a lens disposed between said radiation element and said support block for focusing light in the vicinity of the line through said one end of said light passageways, and a transparent member on the surface of said support block for covering said one end of said light passageways whereby said record medium moves over said transparent member.

10. The reading head of claim 1 wherein the axis of at least one of said light passageways makes an acute angle with the perpendicular to said substantially flat surface.

References Cited

UNITED STATES PATENTS

| | | | |
|---|---|---|---|
| 2,928,596 | 3/1960 | Sims et al. | 235—61.11 |
| 3,064,887 | 11/1962 | Waters et al. | 235—61.11 |

DARYL W. COOK, *Acting Primary Examiner.*

MAYNARD R. WILBUR, *Examiner.*

J. I. SCHNEIDER, *Assistant Examiner.*